March 17, 1964  W. E. GILL ETAL  3,124,980
BORING CUTTER
Filed March 27, 1961
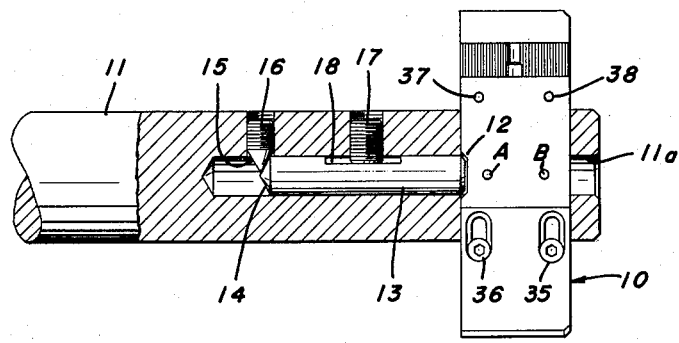
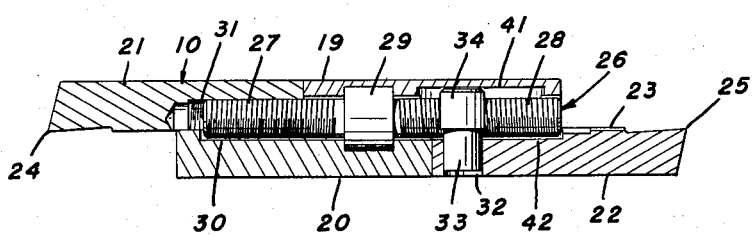
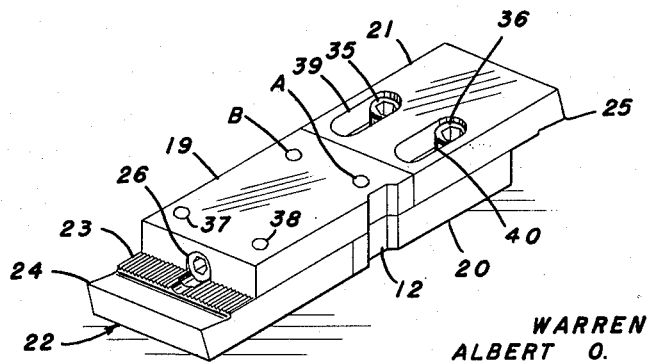
WARREN E. GILL
ALBERT O. ECKERMAN
INVENTORS
BY

United States Patent Office 3,124,980
Patented Mar. 17, 1964

3,124,980
BORING CUTTER
Warren E. Gill, Spring Lake, and Albert O. Eckerman, Muskegon, Mich., assignors to Muskegon Tool Industries, Inc., Muskegon, Mich., a corporation of Michigan
Filed Mar. 27, 1961, Ser. No. 98,532
1 Claim. (Cl. 77—58)

This invention relates to the construction of boring cutters. The operation known as "boring" usually involves one or more cutting members mounted on the outer end of a cantilever arm to engage and enlarge an inside diameter on a work piece. Relative rotation between the arm and the work piece creates the possibility of eccentricity between the bore being enlarged and the newly cut cylindrical surface, and the necessary cantilever arrangement of the arm creates an inevitable resiliency resulting in a non-uniform support for the cutters. It is recognized in the art that these problems can be fairly well controlled by the use of a diametral cutter provided with a cutting edge at its opposite ends, and having a limited freedom to "float" laterally in the supporting arm. The balanced cutting forces at the opposite ends reduce the strain on the supporting arm, and properly-formed cutting edges will result in a tendency for the cutter to center itself within the bore even in the presence of substantial eccentricity. The preferred forms of the cutting edges are familiar to those persons whose work involves the use of these tools.

The amount of float is normally limited to a few thousandths of an inch; and in one standard form of boring device, the cutter is given an approximate central location with respect to the supporting arm by the engagement of an axial pin in the arm with a notch in the side of the cutter. To permit the cutter to be sharpened, its structure commonly involves overlapped members that can be adjusted to increase the effective cutting diameter. This sliding adjustability resulting from the overlapped relationship is used to select and control the operating diameter of the tool. When it becomes necessary to sharpen the tool, the resulting decrease in the length of the overlapped components is compensated for by an adjustment of the overlapped position.

As described up to this point, the structure of the tool is conventional. The presence of the side notch used for approximate centralization of the cutter creates a problem after the tool has been sharpened and adjusted in its overlapping relationship, since the adjustment obviously will distort the slot which had previously extended across the overlapped area at the edges of the overlapped components. This invention provides an improved structure for the boring cutter in which the locating notch is not distorted by the diameter adjustment, with an obvious decrease in the cost of maintenance of the cutter. The several features of the invention will be analyzed in further detail through a discussion of the particular embodiments as illustrated in the accompanying drawings. In the drawings:

FIGURE 1 presents a sectional elevation on the axis of the supporting arm showing the usual manner in which a boring cutter is held in position.

FIGURE 2 presents a sectional elevation on an enlarged scale from that of FIGURE 1 through the central plane of the boring cutter.

FIGURE 3 presents a perspective view of the completely assembled cutter in its adjusted position for minimum cutting diameter.

Referring to the drawings, the diametral cutter generally indicated at 10 is shown mounted in a transverse opening at the outer end of a supporting arm 11. A notch 12 extends along the edge of the cutter 10, and receives the end of the locating pin 13. This pin is slidably mounted in the axial bore 11a, and is provided with a conical end surface 14 engaged by the conical end 15 of the screw 16. Tightening of this screw will drive the locating pin to the right, as shown in FIGURE 1, into engagement with the notch 12. The adjusted position of the pin 13 is locked by the tightening of the set screw 17 engaging the flat 18 on the side of the pin 13. Adjustment of the screws 16 and 17 will result in selection of the desired degree of lateral float of the cutter 10 with respect to the supporting arm 11.

The construction of the cutter 10 is best shown in FIGURE 2, and involves a frame formed by the overlapping members 19 and 20. These are normally fixed with respect to each other by screws at the position shown at A and B. The frame members 19 and 20, together with the blade members 21 and 22, are each formed with serrated surfaces as shown at 23. These surfaces are inter-engaged to form a guideway for determining the path of sliding movement between the blades 21 and 22 and the frame members 19 and 20. These serrations also determine the relative alignment of the frame members 19 and 20.

The adjustment of the overall distance between the cutting edges 24 and 25 is accomplished through the rotation of the screw 26. This screw is provided with thread systems of opposite hand at its ends, respectively, as shown at 27 and 28, and with the enlarged cylindrical central portion 29. The portion 29 is received within a cylindrical recess machined in the frame member 20 to fix the axial position of the screw 26 with respect to the frame members 19 and 20. The threaded end 27 is received freely within a groove 30 in the frame member 20. The rotation of the screw 26 will therefore induce movement of the blade member 21 with respect to the frame along the path determined by the serrations 23.

The blade member 22 is provided with a bore 32 closely receiving the shank 33 of the actuator pin 34. This pin has a threaded diametral bore in engagement with the threads 28 of the screw 26. This arrangement results in the movement of the blade member 22 with respect to the frame whenever the screw is rotated. Since the frame members 19 and 20 remain fixed with respect to each other, the slot 12 is not altered by the adjustment of the screw 26. The adjusted position is locked by tightening conventional locking screws as shown at 35–38. These screws are received within slots as shown at 39 and 40 provided with shoulders on which the heads of the screws 35–38 may engage. The screws traverse the blade members and enter in threaded engagement into the respective frame members 19 and 20. The frame member 19 is machined at 41 to provide clearance for the movement of the pin 34, and the blade 22 receives the threaded portion 28 of the screw 26 with clearance in a slot 42. This arrangement results in a very compact construction, and yet with free access to the end of the screw 26 for adjusting the cutter.

The particular embodiments of the present invention which have been illustrated and discussed herein are for illustrative purposes only and are not to be considered as a limitation upon the scope of the appended claim. In this claim, it is our intent to claim the entire invention disclosed herein, except as we are limited by the prior art.

We claim:
A diametral boring cutter, comprising: a central frame having a locating discontinuity in an edge thereof, said frame including partially overlapped members normally fixed with respect to each other, said overlapped members providing oppositely-extending interengaged guideway means, respectively, and a central discontinuity; first and second blade members secured to said frame and having means engaging said guideway means, respectively, for sliding movement, said second blade member having a transverse bore; a screw rotatably mounted in one of said overlapped members on an axis parallel to said guideway means, said screw having a central cylindrical portion engaging said discontinuity in said central frame to axially fix said screw with respect to said central frame, and also having threaded engagement with said first blade member with threading of a particular hand; an actuator member having threaded engagement with said screw means with threading of opposite hand to said first-named threading, said actuator member having a shank engaging said transverse bore in said second blade member; and locking means for securing the adjusted position of said blade members determined by said screw means.

References Cited in the file of this patent

UNITED STATES PATENTS

| | | |
|---|---|---|
| 1,769,230 | Manning | July 1, 1930 |
| 2,811,055 | Aempel | Oct. 29, 1957 |
| 2,946,245 | Yogus et al. | July 26, 1960 |

FOREIGN PATENTS

| | | |
|---|---|---|
| 810,913 | Germany | Aug. 16, 1951 |
| 885,335 | Germany | Aug. 3, 1953 |